United States Patent
Ferrer et al.

(10) Patent No.: US 10,388,002 B2
(45) Date of Patent: Aug. 20, 2019

(54) AUTOMATIC IMAGE CORRECTION USING MACHINE LEARNING

(71) Applicant: Facebook, Inc., Menlo Park, CA (US)

(72) Inventors: Cristian Canton Ferrer, Sammamish, WA (US); Brian Dolhansky, Seattle, WA (US); Thomas Ward Meyer, Palo Alto, CA (US); Jonathan Morton, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

(21) Appl. No.: 15/855,583

(22) Filed: Dec. 27, 2017

(65) Prior Publication Data

US 2019/0197670 A1 Jun. 27, 2019

(51) Int. Cl.
*G06K 9/00* (2006.01)
*G06T 5/00* (2006.01)
*G06K 9/62* (2006.01)

(52) U.S. Cl.
CPC .......... *G06T 5/005* (2013.01); *G06K 9/00268* (2013.01); *G06K 9/6256* (2013.01); *G06T 2207/30201* (2013.01)

(58) Field of Classification Search
CPC .................. G06T 5/005; G06T 3/4046; G06T 2207/30201; G06T 2207/20081; G06T 2207/20084; G06K 9/00268; G06K 9/6256
See application file for complete search history.

(56) References Cited

U.S. PATENT DOCUMENTS

| 6,898,300 B1 | 5/2005 | Iwaki |
| 2004/0228505 A1 | 11/2004 | Sugimoto |
| 2012/0086775 A1* | 4/2012 | Bae ...................... H04N 13/261 348/46 |

(Continued)

FOREIGN PATENT DOCUMENTS

RU 2596062 C1 8/2016

OTHER PUBLICATIONS

Dolhansky, et al., Eye In-Painting with Exemplar Generative Adversarial Networks, arXiv:1712.03999v1 [cs.CV], Dec. 11, 2017, pp. 1-10.

(Continued)

*Primary Examiner* — Ali Bayat
(74) *Attorney, Agent, or Firm* — Baker Botts L.L.P.

(57) ABSTRACT

In one embodiment, a computing system may access a training image and a reference image of a person and an incomplete image. A generate may generate an in-painted image based on the incomplete image, and a discriminator may be used to determine whether each of the in-painted image, the training image, and the reference image is likely generated by the generator. The system may compute losses based on the determinations and update the discriminator accordingly. Using the updated discriminator, the system may determine whether a second in-painted image generated by the generator is likely generated by the generator. The system may compute a loss based on the determination and update the generator accordingly. Once training is complete, the generator may be used to generate a modified version of a given image, such as making the eyes of a person appear open even if they were closed in the input image.

20 Claims, 11 Drawing Sheets

(56) References Cited

U.S. PATENT DOCUMENTS

| | | | |
|---|---|---|---|
| 2012/0162193 A1* | 6/2012 | Bae | G06T 5/005 |
| | | | 345/419 |
| 2014/0016871 A1 | 1/2014 | Son | |
| 2018/0075581 A1* | 3/2018 | Shi | G06T 3/4053 |
| 2018/0150947 A1* | 5/2018 | Lu | G06N 3/0454 |
| 2018/0184167 A1* | 6/2018 | Vazquez | H04N 21/4627 |
| 2018/0232878 A1* | 8/2018 | Braun | G06T 7/0012 |

OTHER PUBLICATIONS

International Search Report and Written Opinion for International Application No. PCT/US2017/068744, dated Sep. 27, 2018.

\* cited by examiner

US 10,388,002 B2

AUTOMATIC IMAGE CORRECTION USING MACHINE LEARNING

TECHNICAL FIELD

This disclosure generally relates to computer image processing.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services to facilitate social interaction between or among users. For example, users may post photographs on the social-networking system and allow them to be viewed, commented on, and tagged by other users.

A common occurrence when photographing people is that the instantaneous snapshot of a human subject may be less than ideal. For example, the subject's eyes may be closed or partially closed, the mouth may be shaped in an unflattering manner, or the nose may be wrinkled. The difficulty in capturing a desirable instantaneous photograph is even higher when the subject includes multiple persons, due to the inherent difficulty in having everyone posed properly at the instant the photograph is taken. While image processing software may allow a user to manually edit a photograph to correct undesirable features, the process is tedious and time-consuming, requires advanced image-processing skills, and the extent of what could be edited may be limited.

SUMMARY OF PARTICULAR EMBODIMENTS

The subject matter described herein provides an automated process for modifying an image (e.g., a photograph or a frame in a video). In particular embodiments, undesirable portions of an image may be automatically replaced with desirable alternatives. For example, particular embodiments may take as input an image of a person with his eyes closed (the undesirable portion) and output a modified version of the image with the person's eyes opened. In particular embodiments, a machine-learning model may be trained to replace image pixels corresponding to a particular facial feature (e.g., eyes, mouth, etc.) of a person, including the surrounding areas, with automatically generated pixels that depict how that facial feature would likely appear had it been positioned differently (e.g., opened eyes, smiling mouth, etc.). In particular embodiments, the machine-learning model may be based on a Generative Adversarial Network (GAN) and trained using training data samples that each includes a training image of a person along with one or more additional reference images of that person. Based on these images, the machine-learning model may learn how a certain feature type should be replaced to produce realistic modifications (e.g., experiments have shown that even the reflection patterns in a pair of machine-generated eyes would look realistic in the context of the underlying image).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
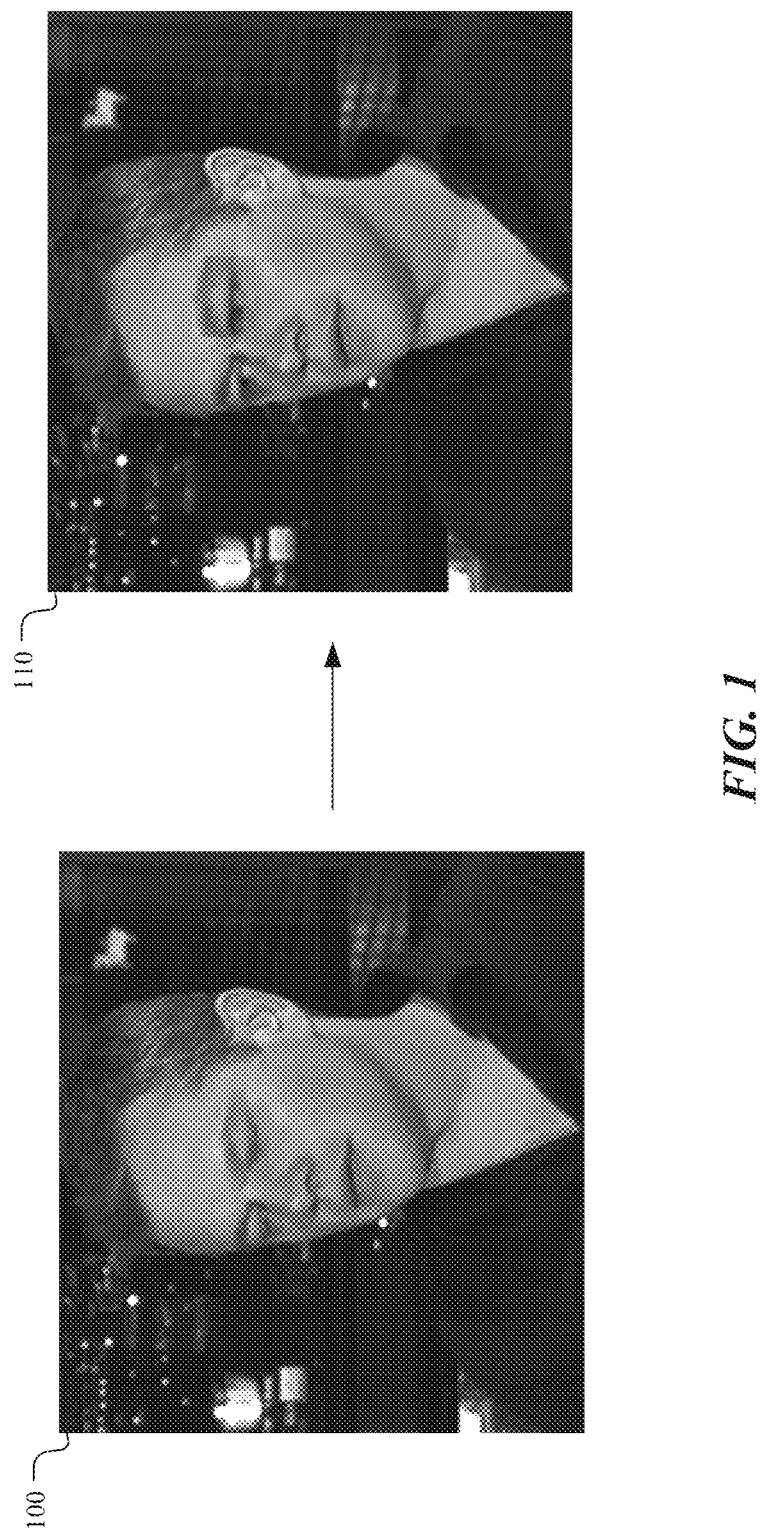
FIG. 1 illustrates an example of an image-modification process where a person's features in an image are modified.

Particular embodiments described herein relate to a machine-learning model trained to modify an image with undesirable portions. FIG. 1 illustrates an example of an image-modification process where a person's features in an image are modified. In particular, FIG. 1 illustrates an example original image 100 of a person whose eyes were closed (e.g., due to blinking) at the moment the image 100 was captured, which may be undesirable. Using particular embodiments described herein, the closed eyes in image 100 may be replaced with automatically generated eyes that are open, as shown in the modified image 110. While not shown, other facial feature types may also be modified using the embodiments described herein, including, for example, a person's eyes, eyebrows, mouth, nose, cheeks, jaws, ears, hair, among others. Furthermore, embodiments described herein may be applied to modify other non-facial feature types, including, for example, a person's torso, arms, hands, fingers, legs, feet, toes, among others.

Figure 2:
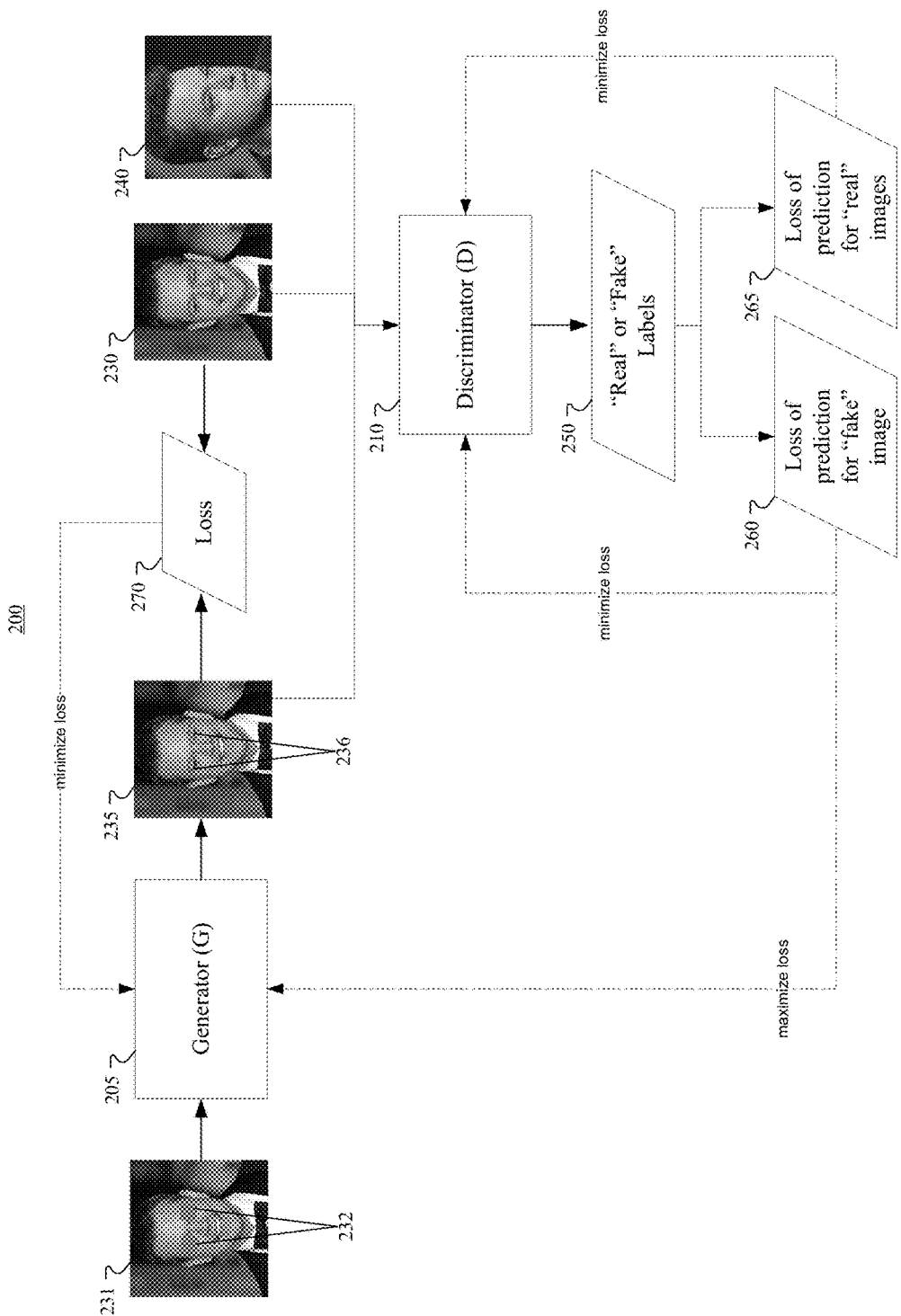
FIG. 2 illustrates a configuration for training a machine-learning model for feature modification.

FIG. 2 illustrates a configuration for training a machine-learning model 200 for feature modification. In particular embodiments, the machine-learning model 200 may be based on Generative Adversarial Network (GAN). GAN may include two separate neural networks, a Generator 205 (interchangeably referred to as "G" herein) and a Discriminator 210 (interchangeably referred to as "D" herein). In particular embodiments, the Generator 205 may be implemented as a deconvolutional neural network and the Discriminator 210 may be implemented as a deconvolutional neural network. At a high level, the Generator 205 may be configured to take as input a given input image and output a modified version of the input image (interchangeably referred to as a "fake image" herein), and the Discriminator 210 may be configured to discriminate between such modified images generated by the Generator 205 and unmodified images that are not generated by Generator 205 (interchangeably referred to as a "real image" herein). The Generator 205 and the Discriminator 210 may be considered as adversaries, because the objective of the Generator 205 is to generate fake image that would fool the Discriminator 210 (in other words, to increase the Discriminator's 210 error rate), and the objective of the Discriminator 210 is to correctly distinguish fake images from the Generator 205 and real images.

In particular embodiments, the machine-learning model 200 may be trained without supervision (i.e., unsupervised machine-learning). This has the advantage of not requiring the training data samples to be labeled, which could often be a time-consuming process.

In particular embodiments, each training sample in the training dataset may be associated with a training image 230 of a person and one or more reference images 240 of the person. Both the training image 230 and the reference image(s) 240 may be "original" images in the sense that they were not generated by the model 200. In particular embodiments, each training sample's training image 230 and reference image(s) 240 may be automatically obtained by retrieving different images of the same person from an image database. For example, in a social-networking system, the same person appearing in different images (regardless of who posted the images) may be tagged as such by different users of the system. Thus, the training images 230 and the corresponding reference images 240 may be retrieved by querying for images with the same tags. In particular embodiments, the training image 230 and the reference image 240 need not depict the same person in a similar fashion and could depict the face of the person from different perspectives (e.g., the training image 230 shows a front view and the reference image 240 shows a perspective view). Furthermore, the reference image 240 need not even be similar to the training image 239 (e.g., the person's eyes may be closed in one image and open in the other), since randomness in the selection of the images may, in fact, improve the robustness of the trained model 200.

In particular embodiments, each training sample may also be associated with an incomplete image 231, which may correspond to the training image 230 of the person with a removed portion 232. The removed portion 232 may correspond to any feature type of interest (e.g., eyes, mouth, etc.). In the example shown in FIG. 2, the removed portion 232 corresponds to the eyes (e.g., including the eyeballs, eye socket, and an area surrounding the eyes), because the illustrated model 200 is configured to modify the eyes of photographed people. If another model is configured to modify the mouths of photographed people, the removed portion of the incomplete image may instead be the mouth of the depicted person (e.g., including the lips and the surrounding area). In particular embodiments, the incomplete image 231 may be generated from the training image 230. For example, facial-feature recognition algorithms may be used to detect the particular facial feature of interest (e.g., eyes) in the training image 230, and the portion corresponding to that facial feature may be automatically removed to generate the incomplete image 231 with the removed portion 232. The incomplete image 231 may be pre-generated and stored with the associated training sample or generated on the fly during training.

In particular embodiments, an incomplete image 231 may be input into the Generator 205 and the Generator 205 may, in turn, generate an in-painted image 235. The in-painted image 235 may correspond to the incomplete image 231 with the removed portion 232 replaced with an in-painted portion 236. In the embodiment shown in FIG. 2, the in-painted portion 236 corresponds to the person's eyes that are missing in the incomplete image 231. In particular embodiments, pixels for the in-painted portion 236 may be generated using the current parameters of the Generator 205, which would be updated in the course of training to be able to better generate pixels that would make the in-painted image 235 look more realistic.

In particular embodiments, training of the model 200 may be performed in stages. For example, a first stage may be for pre-training the Generator 205, a second stage may be for training the Discriminator 210 based on the outputs of the Generator 205, and a third stage may be for retraining/refining the Generator 205 to better "fool" the trained Discriminator 210.

At a high level, during the first stage of pre-training the Generator 205, the parameters of the Generator 205 may be iteratively updated based on a comparison between the generated in-painted images 235 and the corresponding training images 230. For example, for each pair of training image 350 and corresponding in-painted image 235, a reconstruction loss 270 may be computed and used to update the Generator 205. An objective of training is to minimize the reconstruction loss 270. In doing so, the goal is to have the Generator 205 learn how to generate, based on a given incomplete image 231, an in-painted image 235 that looks sufficiently like the original training image 230. In particular embodiments, if the goal is to replace photographed eyes (whether closed, partially closed, or opened) with opened eyes, images of persons with their eyes open (e.g., which may be automatically detected using facial-recognition technology) may be used as the training images 230 for pre-training the Generator 205. Similarly, if other target feature modifications are desired, such as converting a person's mouth to a smile, facial-recognition technology may be used to identify photos of smiling persons to use as the training images 230.

Figure 3:
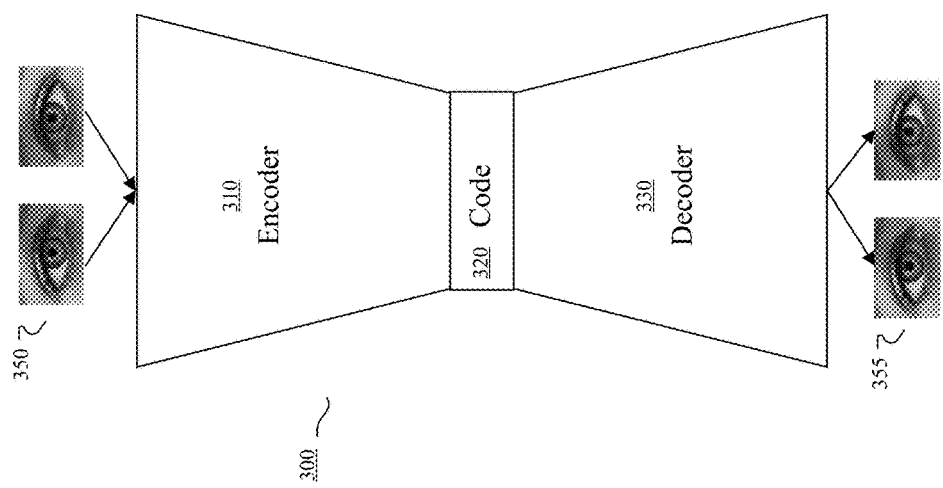
FIG. 3 illustrates a configuration for training an autoencoder for facial features.

In particular embodiments, pre-training the Generator 205 may alternatively or additionally be based on differences between encoded representations of the original and generated features of interest (e.g., eyes). Prior to describing this pre-training process, the encoding process will first be described with reference to FIG. 3, which illustrates a configuration for training an autoencoder 300 for facial features. In particular embodiments, the autoencoder 300 may be trained to generate an encoded representation 320 (e.g., a vector of values) of its input data. In particular embodiments, the autoencoder 300 may comprise an encoder 310 and a decoder 330. The encoder 310 may be configured to receive an input image 350, such as the eyes of a person, and trained to generate an encoded representation 320 of the input image. Based on the encoded representation 320 output by the encoder 310, the decoder 320 may be trained to output an image 355 that is a reconstruction of the input image 350. In particular embodiments, training the autoencoder 300 may involve iteratively processing training samples of images 350 from a sufficiently large training dataset and iteratively updating the parameters of the encoder 310 and decoder 330 so that the encoder 310 learns how to generate an encoded representation 320 that is sufficient to allow the decoder 330 to generate the reconstructed image 355 of the input image 350. In particular embodiments, the training algorithm used for training the autoencoder 300 may use least absolute deviations (L1) or least square errors (L2) as the loss function that measures the differences between the input image 350 and the reconstructed image 355. During training, an objective of the training algorithm is to update the parameters of the encoder 310 and the decoder 330 to minimize the output of the loss function. The training process for the autoencoder 300 may be considered as unsupervised, since the input data itself is being used as the ground truth or target label for the training and therefore no additional labeling is required.

In particular embodiments, the autoencoder 300 may be trained to encode any particular facial feature type (e.g., eyes, nose, mouth, etc.) based on the training data used. For example, if the objective is to train an autoencoder 300 for eyes, the training dataset may be images of eyes; similarly, if the objective is to train an autoencoder 300 for mouths, the training data may be images of mouths. In particular embodiments, the training dataset used for training the autoencoder 300 may or may not overlap with the training dataset used for training the GAN-based machine-learning model described with reference to FIG. 2. In other words, the training samples of eyes used for training the autoencoder 300 may not be of those found in the training samples for the GAN-based machine-learning model. Once the autoencoder 300 has been trained using images of a particular facial feature type, the encoder 310 may be used to process any given input image 350 of that feature type and generate an encoded representation 320 of the input image 350.

Figure 4:
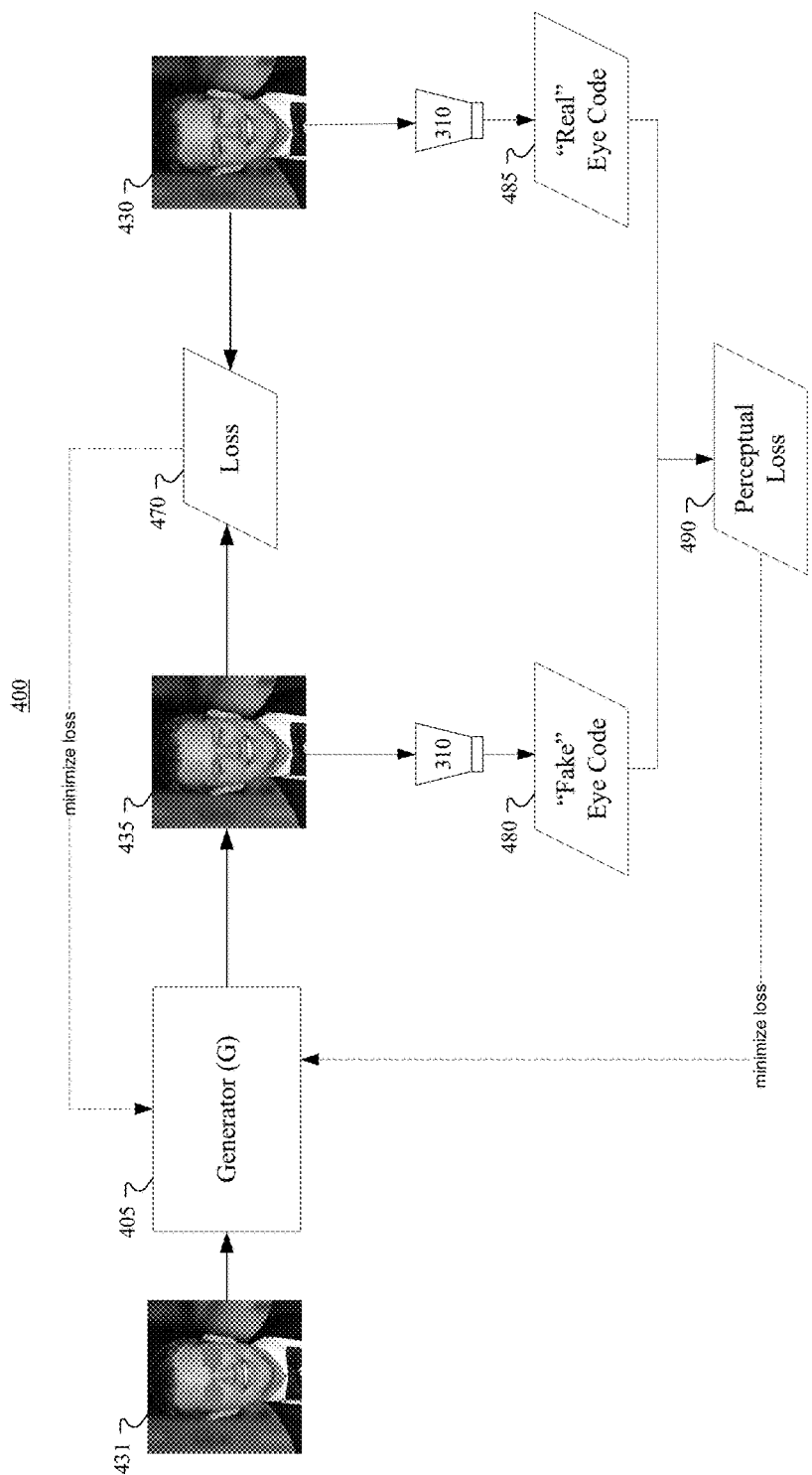
FIG. 4 illustrates a configuration for training a generator based on feature encodings.

FIG. 4 illustrates a configuration for pre-training a Generator 405 based on feature encodings. The illustrated embodiment shows the Generator 405 receiving an incomplete image 431 and outputting an in-painted image 435. As previously described, in particular embodiments the Generator 405 may be updated based on a reconstruction loss 470 computed based on the generated in-painted image 435 and the original training image 430. Alternatively or additionally, the Generator 405 may, in particular embodiments, be pre-trained based on perceptual loss 490. In particular, the facial feature of interest (e.g., eyes) of the generated in-painted image 435 (i.e., the "fake" image) may be processed by the encoder 310 described with reference to FIG. 3 to generate an encoded representation 480 of the "fake," generated eyes. Similarly, the facial feature of interest (e.g., eyes) of the original training image 430 (the "real" image) may be processed by the encoder 310 to generated an encoded representation 485 of the "real," non-generated eyes. In particular embodiments, a perceptual loss 490 may be computed based on a comparison between the encoded representation of the "fake" eyes 480 and the encoded representation of the "real" eyes 485 (e.g., an elementwise-loss like L1 or L2 directly on the encoded representations). The perceptual loss 490 may then be back-propagated and used to update the Generator 405. The goal of the training is to update the Generator 405 in a manner that would minimize the perceptual loss 490.

Returning to FIG. 2, after the Generator 205 has been pre-trained, it may be used to train the Discriminator 210 in accordance with particular embodiments. The Generator 205 may process a given incomplete image 231 and generate an in-painted image 235. The generated in-painted image 235, along with the associated training image 230 and one or more reference images 240, may be provided as input to the Discriminator 210. The training image 230 and the reference image 240 may depict a person from similar or different views. The person in the images may also show similar or different expressions and/or facial-feature configurations (e.g., the training image may show the person having his eyes closed and smiling, and the reference image may show the person having his eyes opened and frowning). The randomness in the images helps the trained model 200 to be more robust, since in operation it may be unknown what kind of images would the model 200 be asked to process.

In particular embodiments, the Discriminator 210 may be tasked with processing the input images (i.e., the in-painted image 235, the training image 230, and the reference image(s) 240) and predicting which are "real" and which are "fake" 250. In particular embodiments, the goal of training the Discriminator is to have it learn how to correctly discriminate between "real" and "fake" images. In particular embodiments, for a given image, the prediction of the Discriminator 210 being closer 1 may represent that the Discriminator 210 thinks that the image is more likely "real," and a prediction being closer to 0 may represent that the Discriminator thinks that the image is less likely to be "real." These predictions may be compared to known labels of the images that indicate which are "fake" and which are "real." Conceptually, the goal of training the Discriminator 210 may be to maximize the Discriminator's 210 prediction values for the training image 230 and the reference image 240, and minimize the Discriminator's 210 prediction value for the in-painted image 235. In other words, if the Discriminator's 210 prediction correctness for the "fake" image (i.e., the in-painted image 235) and the "real" images (i.e., the training image 230 and reference image(s) 240) are represented as losses 260 and 265, respectively, the goal of training the Discriminator 210 would be to minimize the losses (i.e., minimize the incorrect predictions). Based on the loss function and training objective, the parameters of the Discriminator 210 may be iteratively updated after each training prediction so that the Discriminator 210 becomes better at discriminating between "real" and "fake" images.

In particular embodiments, after the Discriminator 210 has been trained, the Discriminator 210 may be used to retrain the Generator 205. The training objective is for the Generator 205 to learn to generate in-painted images 235 that would fool the Discriminator 210 in thinking the images are "real." In particular embodiments, the Generator 205 may generate an in-painted image 235 and the Discriminator 210 may predict a likelihood of the in-painted image 235 being "real" or "fake" 250. If a high predicted value represents the Discriminator 210 thinking that the image is more likely to be "real," then the objective of the training may be expressed in terms of maximizing the Discriminator's 210 predicted value for the "fake" in-painted image 235. If the Discriminator's 210 prediction correctness for the "fake" in-painted image 235 is represented as a loss 260, then the objective of the training may be expressed in terms of maximizing that loss 260. Based on the loss function and training objective, the parameters of the Generator 205 may be iteratively updated after each training so that the Generator 205 becomes better at generating in-painted images 235 that could "fool" the Discriminator 210. Thus, once trained, the Generator 205 may be used to process a given image and automatically generate a realistic in-painted image (e.g., with in-painted eyes).

Figure 5:
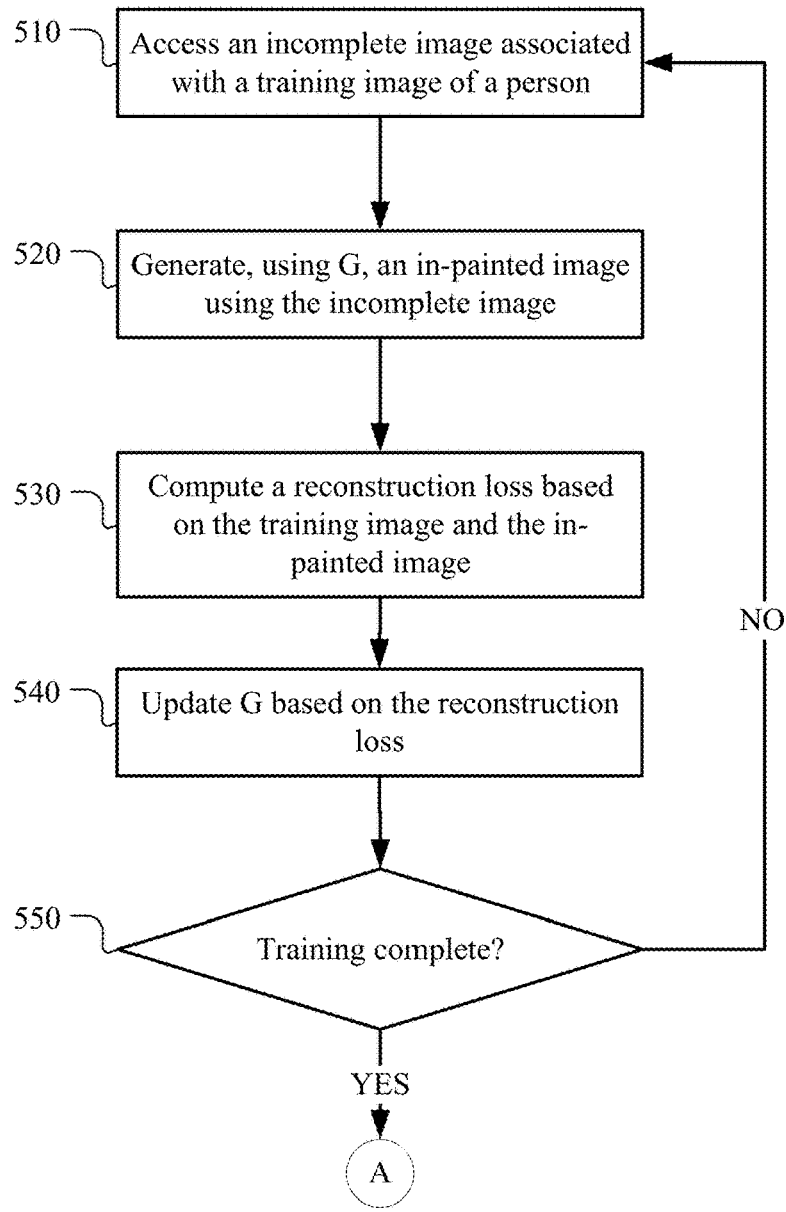
FIG. 5 illustrates an example method for training a generator based on recurrence loss.
Figure 7:
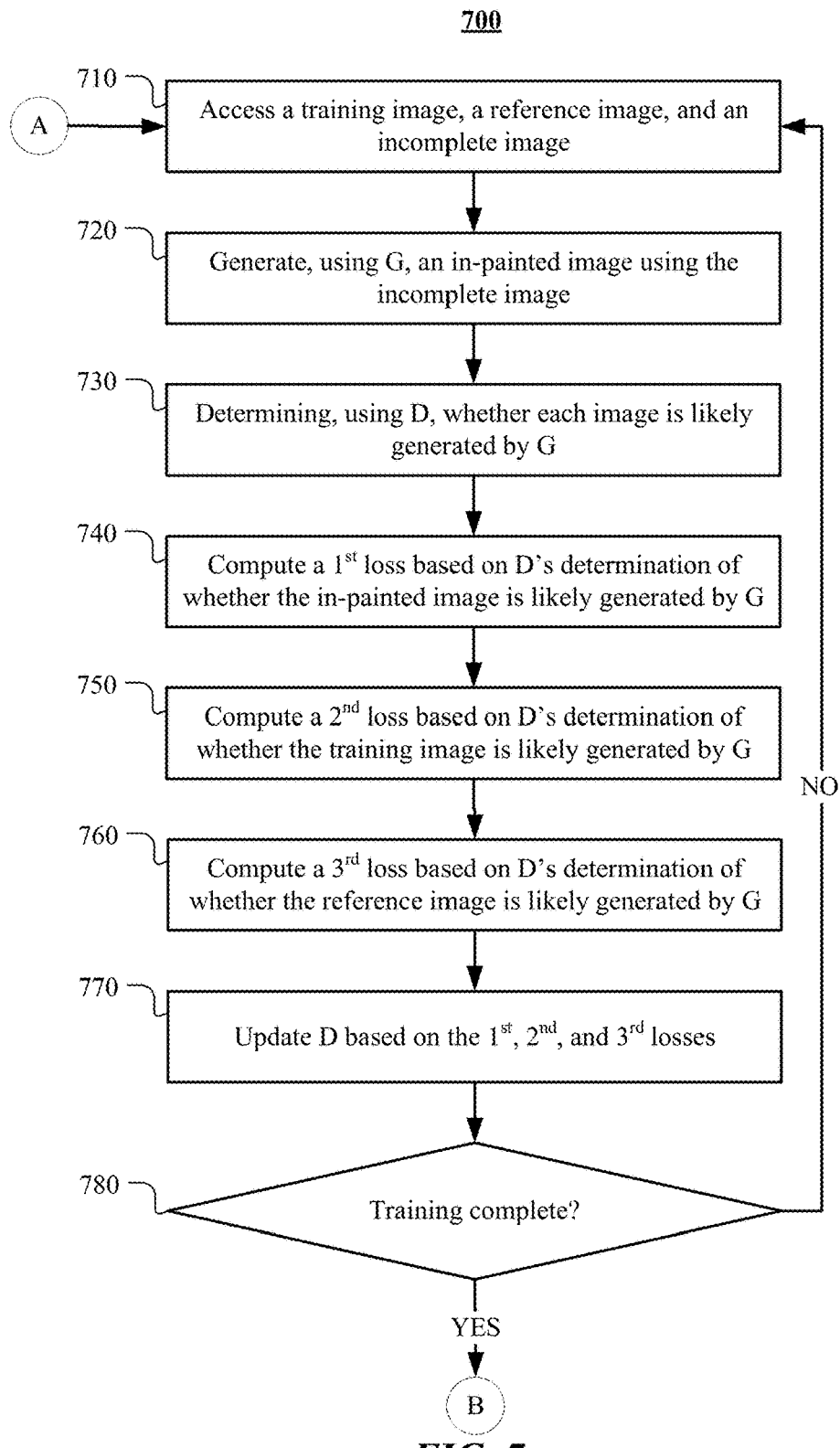
FIG. 7 illustrates an example method for training a discriminator.

FIG. 5 illustrates an example method 500 for training a generator based on recurrence loss, in accordance with particular embodiments. The method may begin at step 510, where a computing system may access an incomplete image associated with a training image of a person. As previously described, the incomplete image may correspond to the training image with a removed portion, such as the depicted person's eyes or other feature that the machine-learning model is being trained to replace. At step 520, the system may generate, using a Generator, an in-painted image base on the incomplete image. The in-painted image includes an in-painted portion that corresponds to the removed portion of the incomplete image. For example, if the removed portion of the incomplete portion corresponds to the eyes of the depicted person in the image, the in-painted portion of the in-painted image may be in-pained eyes. The in-painted image would appear as if the in-painted portion has replaced the removed portion of the incomplete image. At step 530, the system may compute a reconstruction loss based on the training image and the associated in-painted image generated by the Generator. At step 540, the system may then update the Generator based on the reconstruction loss. The parameters of the Generator may be updated with the goal of minimizing the reconstruction loss. Then at step 550, the system may determine whether the training has converged or reached an equilibrium. For example, training may complete if the reconstruction loss is below a certain threshold, and/or if the changes in reconstruction loss have plateaued. If training has not yet complete, the system may repeat the previous steps using another training sample. Otherwise, the system may proceed to the next stage of training, as shown in FIG. 7.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for training a generator based on recurrence loss, including the particular steps of the method of FIG. 5, this disclosure contemplates any suitable method for for training a generator based on recurrence loss, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
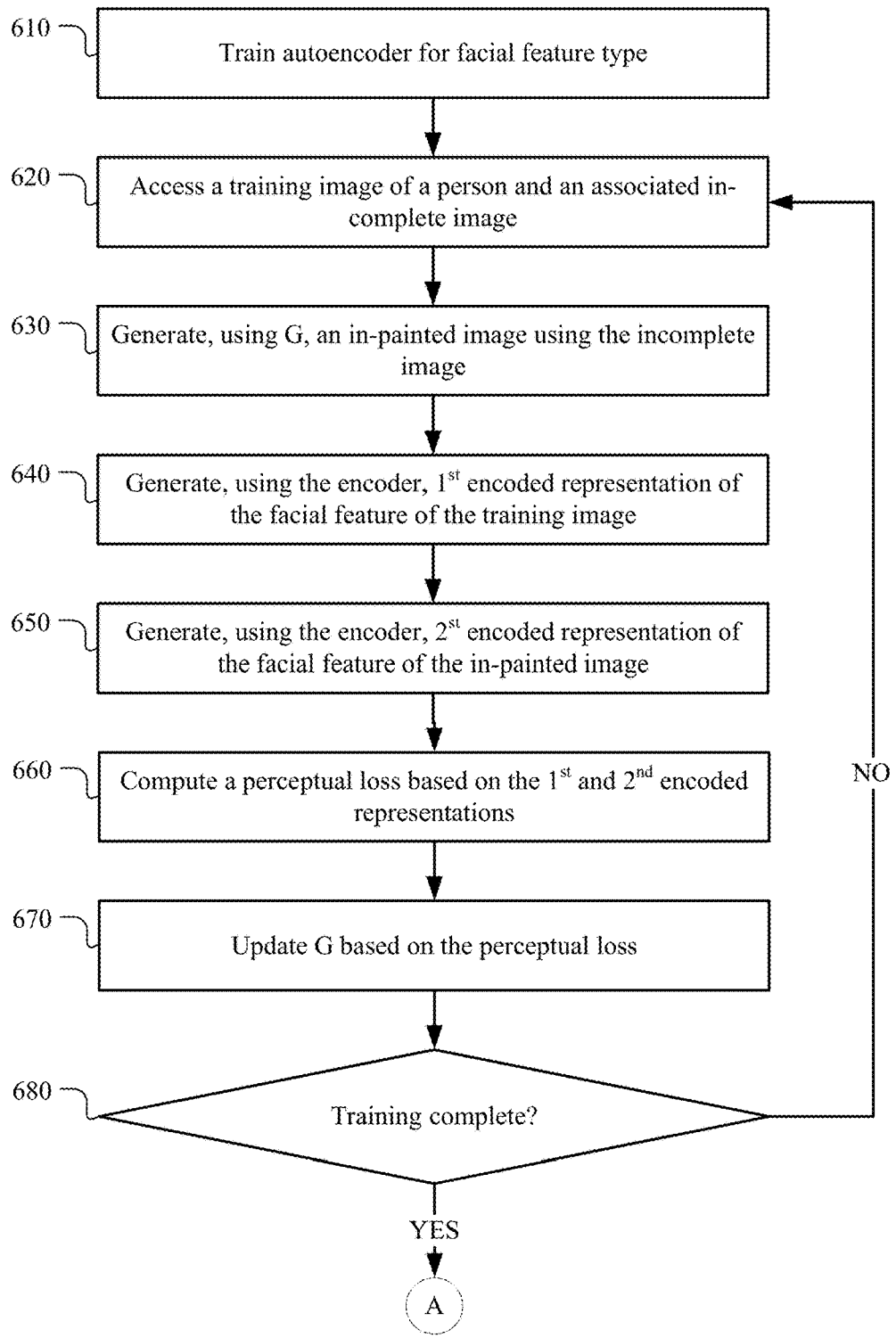
FIG. 6 illustrates an example method for training a generator based on feature encodings.

As described previously, another method for training the Generator is by using encoded representations of features of interest. FIG. 6 illustrates such an example method 600 for training the Generator. In particular embodiments, the Generator may be trained in the manner shown prior to being used to generate in-painted images for training the Discriminator. The method may begin at step 610, where a computing system may train an autoencoder for a particular facial feature type of interest, such as the eyes of a person. As described with reference to FIGS. 3 and 4, the autoencoder, which may comprise an encoder and a decoder, may be trained using training samples of images of the facial feature type of interest (e.g., eyes, mouth, etc.). In particular embodiments, the training samples of images used for training the autoencoder may be different from the training samples used for training the Generator and Discriminator. After the autoencoder has been trained, its encoder may be used to encode images of the feature type of interest, which in turn may be used to train the Generator.

When training the Generator, the system may, at step 620, access a training image and an associated incomplete image. In particular embodiments, the incomplete image may be generated by removing a portion of the training image that corresponds to the feature type of interest (e.g., eyes). At step 630, the system may use the Generator to generate an in-painted image using the incomplete image. In particular embodiments, the in-painted image may be generated by replacing the removed portion of the incomplete image with an in-painted portion that is generated using the Generator's current parameters. The system may then access the training image and the associated in-painted image generated by the generator and generate corresponding encoded representations. For example, at step 640, the system may generate, using the encoder of the autoencoder, a first encoded representation of a portion of the training image that is associated with the facial feature type (e.g., the eyes of a person in the training image). Similarly, at step 650, the system may generate, using the encoder, a second encoded representation of a portion of the in-painted image that is associated with the facial feature type (e.g., the in-painted eyes generated by the Generator). At step 660, the system may compute a perceptual loss based on the first encoded representation and the second encoded representation. At step 670, the system may update the Generator based on the perceptual loss. In particular embodiments, the system may additionally update the Generator based on the aforementioned reconstruction loss. At step 680, the system may determine whether the training is complete based on one or more termination criteria. For example, if the perceptual loss is below a predetermined threshold and/or if its changes over the last several iterations have stabilized (e.g., fluctuated within a predetermined range), then the system may determine that training is complete. Alternatively or additionally, training may be deemed complete if a predetermined number of training iterations have been completed or if a predetermined number of training samples have been used. In the event training is not yet complete, the system may, in particular embodiments, repeat the process starting from step 620 to continue training the Generator. On the other hand, if training is complete, the system may use the trained Generator to train the Discriminator.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for training a generator based on encoded representations of features, including the particular steps of the method of FIG. 6, this disclosure contemplates any suitable method for training a generator, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

FIG. 7 illustrates an example method 700 for training a Discriminator. In particular embodiments, the pre-trained Generator (e.g., using the methods described with reference to FIG. 5 and/or FIG. 6) may be used to train the Discriminator. In particular embodiments, the method may begin at step 710, where a computing system may access a training image of a person, a reference image of the person, and an incomplete image associated with a training sample of a training dataset. The incomplete image may correspond to the training image with a removed portion. The removed portion may correspond a type of facial feature of the depicted person, such as his/her eyes, mouth, or any other feature type of interest. In particular embodiments, the incomplete image may be generated by using facial-feature recognition technology to identify the location of an instance of the feature type of interest in the training image. Based on the location of the detected feature, the system may generate an incomplete image that is substantially identical to the training image except for the pixels surrounding the detected features, which may be replaced with a uniform color. These pixels may be referred to as the removed portion of the incomplete image. The removed portion may have any predetermined shape (e.g., rectangle, oval, etc.) and/or size (e.g., a particular predetermined aspect ratio) that would cover the detected feature and/or some of its surrounding (e.g., edges around the eyes, eyebrows, etc.). In particular embodiments, the incomplete image may be generated by first making a copy the training image and then applying a mask over the portion that is to be removed.

At step 720, the system may generate, using the Generator (which may have been pre-trained), an in-painted image based on the incomplete image. The in-painted image may include an in-painted portion that corresponds to the removed portion of the incomplete image. For example, the in-painted portion and the removed portion may both be associated with a facial feature type. For instance, the removed portion of the incomplete image may be the pixels that correspond to the depicted person's eyes (and the surrounding region), and the in-painted portion of the in-painted image may be corresponding pixels that depict a machine-generated version of the person's eyes (and the surrounding region). In particular embodiments, the Generator may generate the in-painted portion based on its current parameters, which would be iteratively updated during training so that the Generator gets better at generating realistic in-paintings.

At step 730, the system may determine, using a Discriminator, whether each of the in-painted image, the training image, and the reference image is likely generated by the Generator (in other words, "fake"). For example, for each image, the Discriminator may output a value between 0 and 1 that represents a confidence or probability/likelihood of the image being generated by the Generator (i.e., "fake"). For instance, a value closer to 1 may indicate a higher probability/confidence that the image is "real" (i.e., not generated by the Generator) and a value closer to 0 may indicate a lower probability/confidence that the image is "real" (which implicitly means a higher probability/confidence that the image is "fake").

At step 740, the system may compute a first loss based on the determination of whether the in-painted image is likely generated by the Generator. For instance, the first loss may be computed based on a comparison of the prediction (e.g., confidence/probability score) made by the Discriminator and the known label (which may be an implicit label) of the in-painted image being "fake." For example, since the in-painted image is known to be "fake," a prediction that is closer to 1 may result in a higher loss and a prediction that is closer to 0 may result in a lower loss. The loss, in other words, may be a measure of the correctness of the Discriminator's predictions. Similarly, at step 750, the system may compute a second loss based on the determination of whether the training image is likely generated by the Generator. Since the training image is "real," a corresponding prediction that is closer to 1 may result in a lower loss and a prediction that is closer to 0 may result in a higher loss. Similarly, at step 760, the system may compute a third loss based on the determination of whether the reference image is likely generated by the Generator. The reference image is also considered to be "real," so again a corresponding prediction that is closer to 1 may result in a lower loss and a prediction that is closer to 0 may result in a higher loss.

At step 770, the system may update the discriminator based on the first loss, the second loss, and the third loss. In particular embodiments, these losses may be back-propagated and used by the training algorithm to update the parameters of the Discriminator so that, over the course of the training, the Discriminator would progressively become better at discriminating between "fake" versus "real" images. The goal of the training algorithm may be to minimize the losses (i.e., minimize the incorrect predictions). In particular embodiments, while the Discriminator may be updated at this time, the Generator may remain unchanged.

At step 780, the system may determine whether training has completed. This may be based on any suitable convergence metric. For example, if the first, second, and third losses are within a threshold value and/or remain within a threshold range for several training iterations, the system may determine that training is complete for the Discriminator. As another example, training may be deemed complete after a certain predetermined number of training iterations or when no more training samples in the training dataset remains. In particular embodiments, if the system determines that training is not complete, it may repeat the training process starting at, e.g., step 710. If the system determines that training is complete, it may then use the trained Discriminator to re-train the Generator.

Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for training a Discriminator, including the particular steps of the method of FIG. 7, this disclosure contemplates any suitable method for training a Discriminator, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
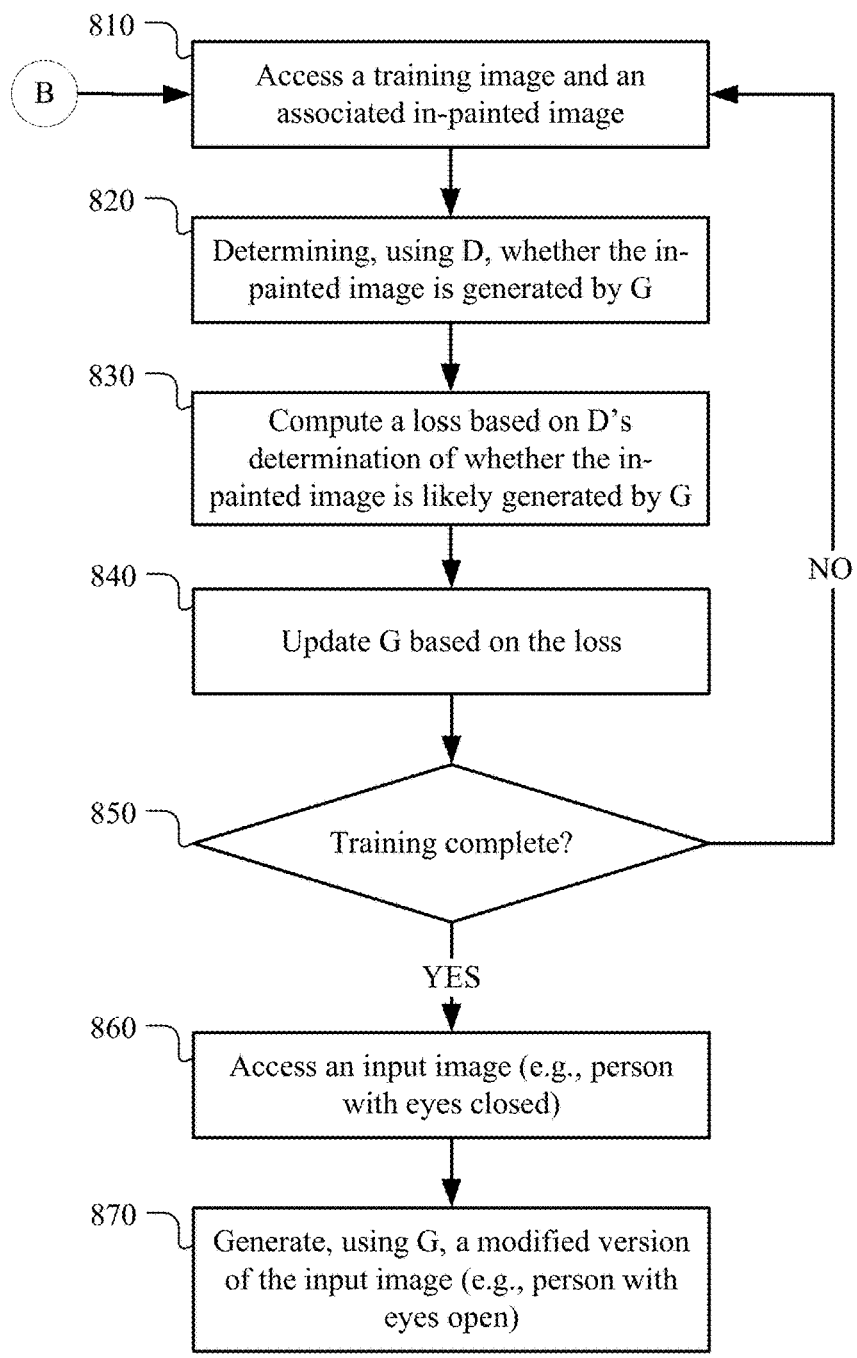
FIG. 8 illustrates an example method for training a generator based on outputs from a discriminator and using the generator to modify images.

FIG. 8 illustrates an example method for training a Generator based on outputs from a Discriminator and using the Generator to modify images. The method may begin at step 810, where a computing system may access a training image and an associated in-painted image. In particular embodiments, the in-painted image may have been used in the training of the Discriminator or newly generated at this time. At step 820, the system may determine, using the trained Discriminator, whether the given in-painted image generated by the Generator is likely generated by the Generator (i.e., whether it is "fake" or "real"). At step 830, the system may compute a loss based on the determination of whether the in-painted image is likely generated by the Generator, similar to how losses are determined for in-painted images as described above with reference to FIG. 7. At step 840, the system may update the Generator based on the loss. Since the Generator's objective is to "fool" the Discriminator in thinking that in-painted images generated by the Generator are "real," the training algorithm may be configured to optimize the loss. In other words, the Generator's parameters would be updated with the goal of generating in-painted images that would cause the loss of the Discriminator's prediction to increase (i.e., to increase its incorrect predictions). Then at step 850, the system may determine whether training is complete. In particular embodiments, training may be deemed complete when the computed losses over several iterations are above a certain threshold and/or within a certain predetermined range that indicates an equilibrium has been reached. Additionally or alternatively, training may be deemed complete after a certain predetermined number of training iterations and/or if all the training samples in the training dataset have been used to train the model. If it is determined that training is incomplete, the system may continue to iteratively train the Generator starting at step 810. If it is instead determined that training is complete, then the Trained Generator may be used in operation.

Once the Generator has been trained, it would be configured to receive an input image and generate a modified version of the input image that includes a portion that is in-painted by the Generator. For example, at step 860, a computing system using the Generator may access an input image, which may include a person with closed eyes. If the Generator is trained to replace closed eyes with opened eyes, the Generator may process the input image and output a modified version of the input image where the person's eyes appear opened, such as the example shown in FIG. 1. The in-painted eyes would look realistic, including even the glimmer in the eyes. In particular embodiments, the model may also accept parameters specifying feature preferences for the in-painting. For example, a parameter may instruct the Generator to in-paint eyes with a specified color. Although opening of the eyes is used in this example, other feature modifications may be made as well, such as modifying a person's mouth so that it appears to be smiling/frowning, modifying a person's hidden ear or other features so that it appears in the image, etc., depending on the training data used. Further, once the Generator is trained, it may be used to modify images of any person (in other words, it is not limited to modifying images of persons who appeared in the training dataset). The trained Generator may also be distributed to different platforms different from the training system, including, for example, users' mobile devices or other personal computing devices.

Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for training a Generator, including the particular steps of the method of FIG. 8, this disclosure contemplates any suitable method for training a Generator, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
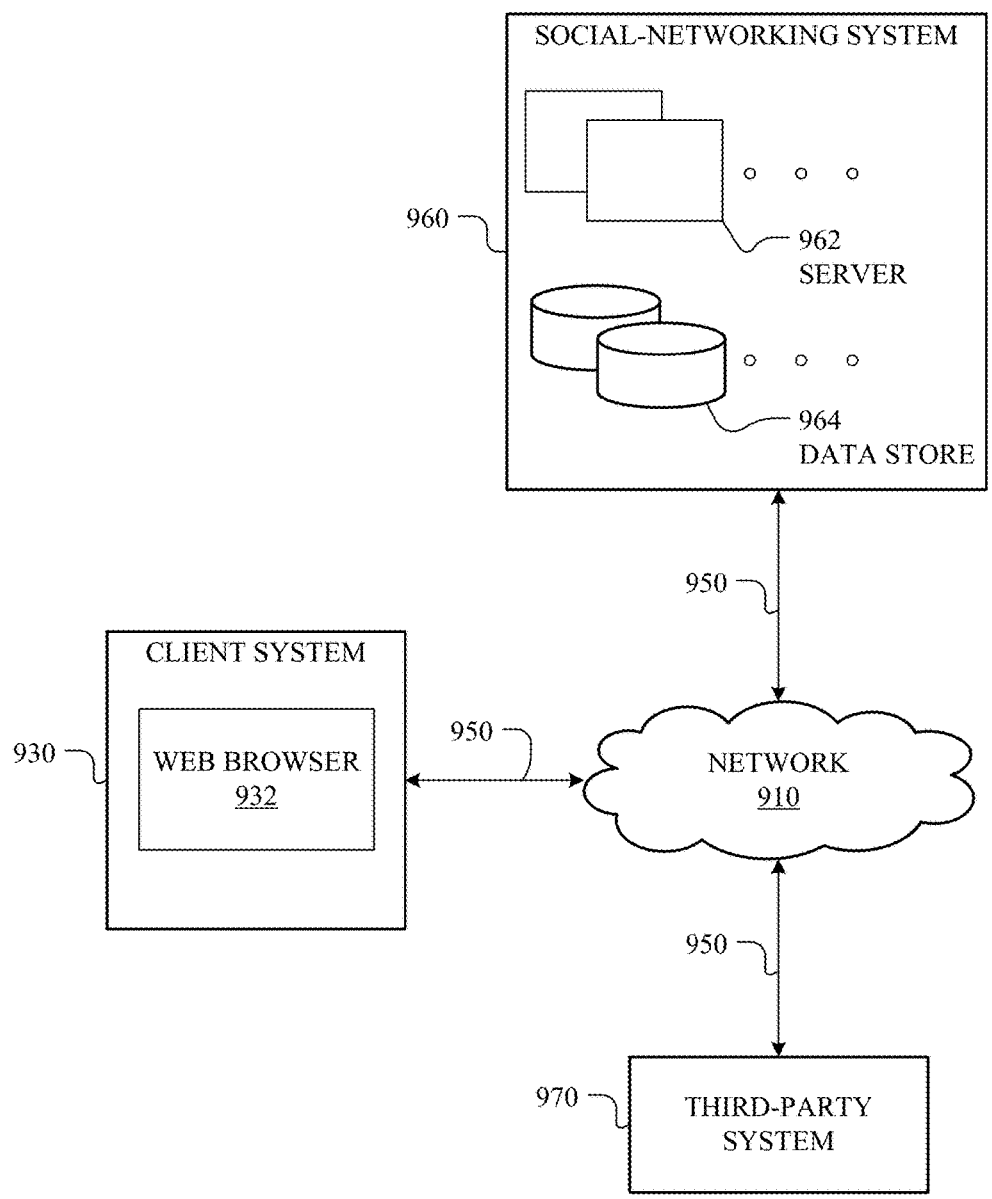
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. As an example and not by way of limitation, client system 930 may access social-networking system 960 using a web browser 932, or a native application associated with social-networking system 960 (e.g., a mobile social-networking application, a messaging application, another suitable application, or any combination thereof) either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 to whom they want to be connected. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
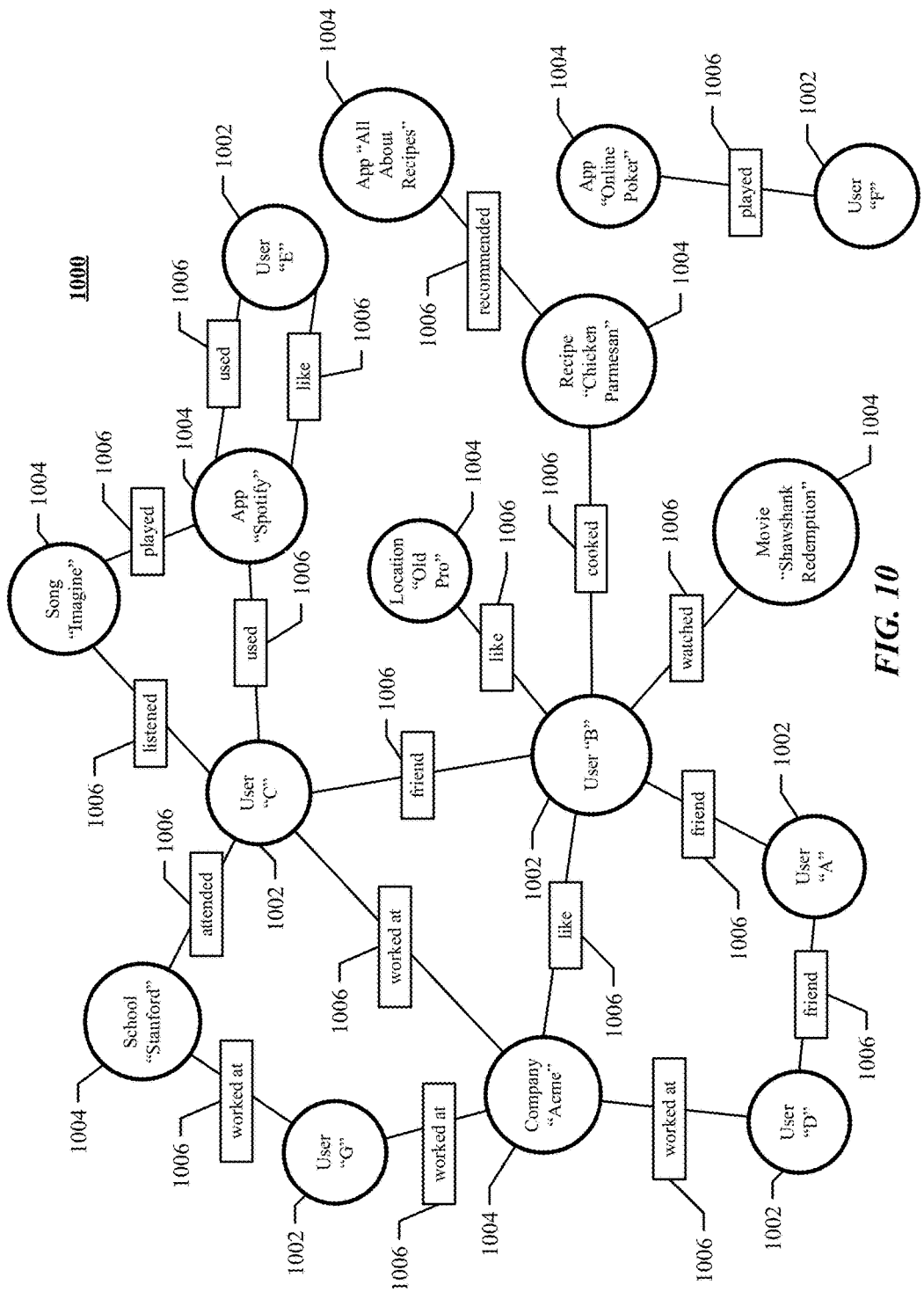
FIG. 10 illustrates an example social graph.

FIG. 10 illustrates example social graph 1000. In particular embodiments, social-networking system 960 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 960, client system 930, or third-party system 970 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 960. As an example and not by way of limitation, a user may be an individual (human user), an entity (e.g., an enterprise, business, or third-party application), or a group (e.g., of individuals or entities) that interacts or communicates with or over social-networking system 960. In particular embodiments, when a user registers for an account with social-networking system 960, social-networking system 960 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 960. In particular embodiments, a user node 1002 may be associated with information provided by a user or information gathered by various systems, including social-networking system 960. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 960 or a third-party website associated with a web-application server); an entity (such as, for example, a person, business, group, sports team, or celebrity); a resource (such as, for example, an audio file, video file, digital photo, text file, structured document, or application) which may be located within social-networking system 960 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1004 may be associated with information of a concept provided by a user or information gathered by various systems, including social-networking system 960. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 960. Profile pages may also be hosted on third-party websites associated with a third-party system 970. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 970. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 930 to send to social-networking system 960 a message indicating the user's action. In response to the message, social-networking system 960 may create an edge (e.g., a check-in-type edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 960 may send a "friend request" to the second user. If the second user confirms the "friend request," social-networking system 960 may create an edge 1006 connecting the first user's user node 1002 to the second user's user node 1002 in social graph 1000 and store edge 1006 as social-graph information in one or more of data stores 964. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006. The degree of separation between two objects represented by two nodes, respectively, is a count of edges in a shortest path connecting the two nodes in the social graph 1000. As an example and not by way of limitation, in the social graph 1000, the user node 1002 of user "C" is connected to the user node 1002 of user "A" via multiple paths including, for example, a first path directly passing through the user node 1002 of user "B," a second path passing through the concept node 1004 of company "Acme" and the user node 1002 of user "D," and a third path passing through the user nodes 1002 and concept nodes 1004 representing school "Stanford," user "G," company "Acme," and user "D." User "C" and user "A" have a degree of separation of two because the shortest path connecting their corresponding nodes (i.e., the first path) includes two edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 960 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 960 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 960 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social-networking system 960 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 930) may indicate that he or she likes the concept represented by the concept node 1004 by clicking or selecting a "Like" icon, which may cause the user's client system 930 to send to social-networking system 960 a message indicating the user's liking of the concept associated with the concept-profile page. In response to the message, social-networking system 960 may create an edge 1006 between user node 1002 associated with the user and concept node 1004, as illustrated by "like" edge 1006 between the user and concept node 1004. In particular embodiments, social-networking system 960 may store an edge 1006 in one or more data stores. In particular embodiments, an edge 1006 may be automatically formed by social-networking system 960 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Figure 11:
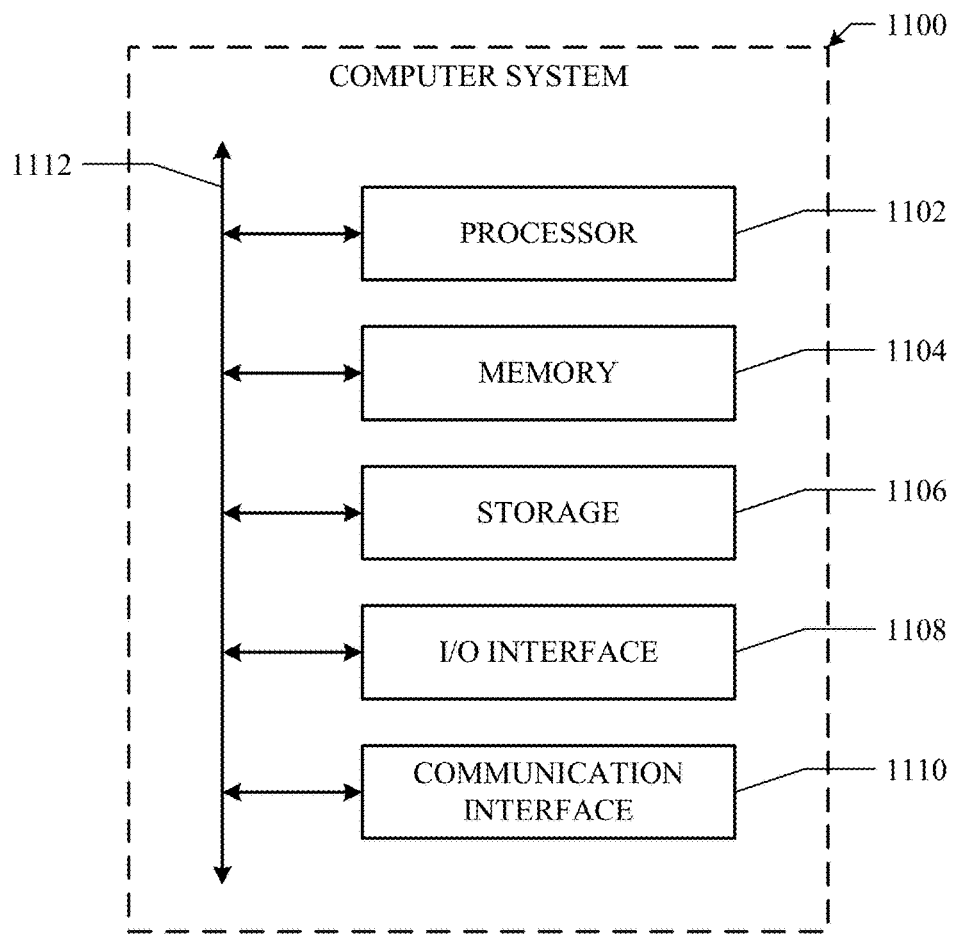
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical drive, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:

accessing a training image of a person, a reference image of the person, and an incomplete image, wherein the incomplete image corresponds to the training image with a removed portion, wherein the training image, the reference image, and the incomplete image are associated with a training sample of a training dataset;

generating, using a generator, an in-painted image based on the incomplete image, wherein the in-painted image includes an in-painted portion that corresponds to the removed portion of the incomplete image;

determining, using a discriminator, whether each of the in-painted image, the training image, and the reference image is likely generated by the generator;

computing a first loss based on the determination of whether the in-painted image is likely generated by the generator;

computing a second loss based on the determination of whether the training image is likely generated by the generator;

computing a third loss based on the determination of whether the reference image is likely generated by the generator;

updating the discriminator based on the first loss, the second loss, and the third loss;

determining, using the updated discriminator, whether a second in-painted image generated by the generator is likely generated by the generator, wherein the second in-painted image is associated with a second training image;

computing a fourth loss based on the determination of whether the second in-painted image is likely generated by the generator; and updating the generator based on the fourth loss;

wherein the updated generator is configured to receive an input image and generate a modified version of the input image, wherein the modified version of the input image includes a portion that is in-painted by the updated generator.

2. The method of claim 1, wherein prior to using the generator to generate the in-painted image, the method further comprises:

computing a reconstruction loss based on a third training image and an associated third in-painted image generated by the generator; and updating the generator based on the reconstruction loss.

3. The method of claim 1, wherein the removed portion and the in-painted portion are associated with a facial feature type.

4. The method of claim 3, wherein prior to using the generator to generate the in-painted image, the method further comprises:

training an autoencoder using training samples of images of the facial feature type, the autoencoder comprising an encoder and a decoder;
accessing a third training image and an associated third in-painted image generated by the generator;
generating, using the encoder, a first encoded representation of a portion of the third training image that is associated with the facial feature type;
generating, using the encoder, a second encoded representation of a portion of the third in-painted image that is associated with the facial feature type;
computing a perceptual loss based on the first encoded representation and the second encoded representation; and
updating the generator based on the perceptual loss.

5. The method of claim 4, wherein the training samples of images of the facial feature type are associated with a second training dataset different from the training dataset.

6. The method of claim 1, wherein the training image and the reference image depict a face of the person from different perspectives.

7. The method of claim 1,
wherein the input image is of a second person with closed or partially closed eyes; and
wherein the modified version of the input image is of the second person with opened eyes.

8. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
accessing a training image of a person, a reference image of the person, and an incomplete image, wherein the incomplete image corresponds to the training image with a removed portion, wherein the training image, the reference image, and the incomplete image are associated with a training sample of a training dataset;
generating, using a generator, an in-painted image based on the incomplete image, wherein the in-painted image includes an in-painted portion that corresponds to the removed portion of the incomplete image;
determining, using a discriminator, whether each of the in-painted image, the training image, and the reference image is likely generated by the generator;
computing a first loss based on the determination of whether the in-painted image is likely generated by the generator;
computing a second loss based on the determination of whether the training image is likely generated by the generator;
computing a third loss based on the determination of whether the reference image is likely generated by the generator;
updating the discriminator based on the first loss, the second loss, and the third loss;
determining, using the updated discriminator, whether a second in-painted image generated by the generator is likely generated by the generator, wherein the second in-painted image is associated with a second training image;
computing a fourth loss based on the determination of whether the second in-painted image is likely generated by the generator; and
updating the generator based on the fourth loss;
wherein the updated generator is configured to receive an input image and generate a modified version of the input image, wherein the modified version of the input image includes a portion that is in-painted by the updated generator.

9. The system of claim 8, wherein prior to using the generator to generate the in-painted image, wherein the processors are further operable when executing the instructions to perform operations comprising:
computing a reconstruction loss based on a third training image and an associated third in-painted image generated by the generator; and
updating the generator based on the reconstruction loss.

10. The system of claim 8, wherein the removed portion and the in-painted portion are associated with a facial feature type.

11. The system of claim 10, wherein prior to using the generator to generate the in-painted image, the processors are further operable when executing the instructions to perform operations comprising:
training an autoencoder using training samples of images of the facial feature type, the autoencoder comprising an encoder and a decoder;
accessing a third training image and an associated third in-painted image generated by the generator;
generating, using the encoder, a first encoded representation of a portion of the third training image that is associated with the facial feature type;
generating, using the encoder, a second encoded representation of a portion of the third in-painted image that is associated with the facial feature type;
computing a perceptual loss based on the first encoded representation and the second encoded representation; and
updating the generator based on the perceptual loss.

12. The system of claim 11, wherein the training samples of images of the facial feature type are associated with a second training dataset different from the training dataset.

13. The system of claim 8, wherein the training image and the reference image depict a face of the person from different perspectives.

14. The system of claim 8,
wherein the input image is of a second person with closed or partially closed eyes; and
wherein the modified version of the input image is of the second person with opened eyes.

15. One or more computer-readable non-transitory storage media embodying software that is operable when executed to cause one or more processors to perform operations comprising:
accessing a training image of a person, a reference image of the person, and an incomplete image, wherein the incomplete image corresponds to the training image with a removed portion, wherein the training image, the reference image, and the incomplete image are associated with a training sample of a training dataset;
generating, using a generator, an in-painted image based on the incomplete image, wherein the in-painted image includes an in-painted portion that corresponds to the removed portion of the incomplete image;
determining, using a discriminator, whether each of the in-painted image, the training image, and the reference image is likely generated by the generator;
computing a first loss based on the determination of whether the in-painted image is likely generated by the generator;

computing a second loss based on the determination of whether the training image is likely generated by the generator;

computing a third loss based on the determination of whether the reference image is likely generated by the generator;

updating the discriminator based on the first loss, the second loss, and the third loss;

determining, using the updated discriminator, whether a second in-painted image generated by the generator is likely generated by the generator, wherein the second in-painted image is associated with a second training image;

computing a fourth loss based on the determination of whether the second in-painted image is likely generated by the generator; and updating the generator based on the fourth loss;

wherein the updated generator is configured to receive an input image and generate a modified version of the input image, wherein the modified version of the input image includes a portion that is in-painted by the updated generator.

16. The media of claim 15, wherein prior to using the generator to generate the in-painted image, the software is further operable when executed to cause the one or more processors to perform operations comprising:

computing a reconstruction loss based on a third training image and an associated third in-painted image generated by the generator; and updating the generator based on the reconstruction loss.

17. The media of claim 15, wherein the removed portion and the in-painted portion are associated with a facial feature type.

18. The media of claim 17, wherein prior to using the generator to generate the in-painted image, the software is further operable when executed to cause the one or more processors to perform operations comprising:

training an autoencoder using training samples of images of the facial feature type, the autoencoder comprising an encoder and a decoder;

accessing a third training image and an associated third in-painted image generated by the generator;

generating, using the encoder, a first encoded representation of a portion of the third training image that is associated with the facial feature type;

generating, using the encoder, a second encoded representation of a portion of the third in-painted image that is associated with the facial feature type;

computing a perceptual loss based on the first encoded representation and the second encoded representation; and updating the generator based on the perceptual loss.

19. The media of claim 18, wherein the training samples of images of the facial feature type are associated with a second training dataset different from the training dataset.

20. The media of claim 15, wherein the training image and the reference image depict a face of the person from different perspectives.

* * * * *